United States Patent
Poe et al.

(10) Patent No.: US 11,280,440 B2
(45) Date of Patent: Mar. 22, 2022

(54) RE-SETTABLE PIPELINE GAUGING TOOL WITH DEFORMABLE BODY

(71) Applicant: TDW Delaware, Inc., Wilmington, DE (US)

(72) Inventors: Roger L. Poe, Beggs, OK (US); Ed Maynard, Holladay, UT (US); Joseph Alan Morton, Tulsa, OK (US)

(73) Assignee: TDW Delaware, Inc., Wilmington, DE (US)

( * ) Notice: Subject to any disclaimer, the term of this patent is extended or adjusted under 35 U.S.C. 154(b) by 0 days.

(21) Appl. No.: 17/142,760

(22) Filed: Jan. 6, 2021

(65) Prior Publication Data

US 2021/0207758 A1    Jul. 8, 2021

Related U.S. Application Data

(60) Provisional application No. 62/958,148, filed on Jan. 7, 2020.

(51) Int. Cl.
| | |
|---|---|
| *F16L 55/40* | (2006.01) |
| *G01N 27/72* | (2006.01) |
| *G01N 27/87* | (2006.01) |
| *F16L 101/30* | (2006.01) |

(52) U.S. Cl.
CPC .............. *F16L 55/40* (2013.01); *G01N 27/72* (2013.01); *F16L 2101/30* (2013.01)

(58) Field of Classification Search
CPC ...... F16L 55/40; F16L 2101/30; G01N 27/72; G01N 27/87
See application file for complete search history.

(56) References Cited

U.S. PATENT DOCUMENTS

| | | | |
|---|---|---|---|
| 3,949,292 A * | 4/1976 | Beaver | G01M 3/005 |
| | | | 324/220 |
| 5,659,142 A * | 8/1997 | Lima | F16L 55/28 |
| | | | 73/865.8 |
| 8,925,400 B2 | 1/2015 | Hill et al. | |
| 2003/0029256 A1 | 2/2003 | Savard | |

(Continued)

FOREIGN PATENT DOCUMENTS

| | | | | |
|---|---|---|---|---|
| CA | 2989027 A1 * | 6/2018 | ............ | G01F 1/684 |
| CN | 107356219 A | 11/2017 | | |
| EP | 3298396 A1 | 3/2018 | | |

*Primary Examiner* — David L Singer
*Assistant Examiner* — Anthony W Megna Fuentes
(74) *Attorney, Agent, or Firm* — GableGotwals (57) ABSTRACT

A re-settable pipeline gauging tool (10) of this disclosure includes a cylindrical tool body (11) that includes a deformable portion (13) with a plurality of sensors (25) located near or on an external circumferential surface (12) of the deformable portion. A sealed unit (60) contains a corresponding signal source (25). Pipeline gauging relies upon the compressibility and elasticity inherent in the deformable portion as it encounters anomalies in pipeline geometry and moves between a first size and a second size, the signal strength of the source detected by the sensors changing as a result. The sensors may be arrayed in a circumferential band (47) about the deformable portion or along its length. In some embodiments, the sensors and source are magnetic or acoustic (e.g., transceivers or radar integrated chips). In other embodiments, the sensors and source are light or fiber optic.

13 Claims, 4 Drawing Sheets

(56) References Cited

U.S. PATENT DOCUMENTS

| | | | |
|---|---|---|---|
| 2013/0291635 A1* | 11/2013 | Di Lullo | F16L 55/40 73/488 |
| 2018/0172638 A1* | 6/2018 | Banks | F16L 55/40 |
| 2018/0363827 A1* | 12/2018 | Vreenegoor | G01R 33/0005 |
| 2021/0088169 A1* | 3/2021 | Lines | G01B 7/00 |

* cited by examiner

RE-SETTABLE PIPELINE GAUGING TOOL WITH DEFORMABLE BODY

CROSS-REFERENCE TO CO-PENDING APPLICATIONS

This application claims priority to U.S. 62/958,148 filed 7 Jan. 2020.

BACKGROUND

This disclosure is in the field of pipeline inspection tools like those used to inspect oil and gas pipelines or water pipelines.

Whenever there is pressure contained in a metal pipeline there will always be a need to diagnose the capability of the line to be operated safely under the design pressure given. Pipelines—like those typically used to transport hydrocarbon products or used to transport water—may be damaged in a number of ways and, over time, the lines may be de-rated due to geometry changes. For example, where high pressures are maintained, the pipes may continually lose wall thickness to erosion and oxidation. Heavy equipment may dent the wall of the line during excavation work. Earthquakes, landslides or flooding may shift or wash the stable earth from under the pipeline, allowing the line to bend or change shape. In other cases, heavy overburden on top of a buried pipe may cause the pipeline to become egg-shaped.

Because of the potential for damage to pipeline integrity, and out of public and environmental safety concerns for people who live or work around pipelines, the federal government has established laws mandating regular pipeline inspection. To facilitate these inspections, companies have designed very sophisticated tools that can move through the pipeline and take very precise measurements relative to changes in pipeline geometry such as dents, erosion, corrosion and welding. The tools are designed to keep the integrity of the pipeline in check and help operators ensure the contents of the pipeline remain safe and incapable of causing harm to those living or working around the pipeline.

Each time one of these tools is placed into a pipeline, there is a real potential the tool may become hung up or wedged in the line due to dents or other imperfections within the line. When this happens there is a significant impact to the flowing liquid or gas within the line that can no longer be delivered due to the large tool blocking the line. If the operator is lucky, the tool can be backed out of the pipeline. Or, if unlucky, the line must be evacuated or plugged in such a way as to allow the pipeline to be safely cut open to extract the tool. This plugging significantly impacts product flow and, in some cases, the resulting revenue loss can escalate to millions of dollars a day. Additionally, the tool itself—which can cost anywhere from $100,000 to more than $1,000,000—may sustain damage and require repair. To avoid the wedging problem, pigging operations may be performed in which increasingly aggressive, and consecutively launched, cleaning pigs clean the line and then pigging tools having aluminum gauge plates check the line. The gauge plates are sized to be slightly smaller than the diameter of the more sophisticated and expensive inspection tool. When the gauge plate strikes a dent or imperfection in the line, the plate bends, allowing an operator to identify a potential problem. However, the gauge plate does not allow for identification of multiple impacts. Once the plate is bent or deformed the operator can no longer be certain of the plurality of problems which may be awaiting the larger, more sophisticated tool when placed in the line.

Other instrumented pigs are known in the art. For example, U.S. Pat. No. 8,925,400 B2 to Hill et al. (Pipeline Innovations Ltd) discloses an instrumented pig including "a foam body having an outer surface and an inner cavity in which, in use, is located a sealed unit housing at least a part of a parameter measurement apparatus configured to measure at least one parameter from which the extent of deflection of the outer surface of the foam body may be derived, the sealed unit including at least one sensor configured to generate an output signal representative of the at least one measured parameter." The sensors are placed inside the housing to avoid erosion of signal strength or sensitivity. The magnets are placed near the surface, where they can be prone to being pulled toward the pipe, therefore providing false readings, or pulled completely out of the foam and attached to the pipeline wall.

SUMMARY

Embodiments of a pipeline gauging tool of this disclosure provide a lower-cost pipeline tool that can be used to identify and establish the position and severity of dents and imperfections in a pipeline that can cause problems when more sophisticated or higher-cost pipeline tools like those discussed in the Background of this disclosure are put into the line for inspection or line qualification. A pipeline gauging tool of this disclosure may be used in a pressurized line containing a fluid medium. The pipeline may be a line used to transport natural gas, crude oil, gasoline, jet fuel or water. The pipeline may be line used to transport air, hydrogen, or other gases.

A foam pig of this disclosure with its magnetic field capabilities, acoustic capabilities, laser capabilities, or fiber optic capabilities may be used to provide operators the ability to detect virtually all changes in geometry of the line—including but not limited to impact points, welds, and bends—with enough certainty to make informed decisions relative to the insertion and operation of the more higher technology and higher cost pigging equipment that will follow. For example, embodiments of a foam pig of this disclosure including fiber optic capabilities could be used in connection with a fiber optic cable or strip and an LED emitting light source to establish voltage variations caused by deflection or deformation and a photovoltaic cell may be used to measure the voltage variations in the intensity of light as the fiber optic strip moves over a dent or imperfection. The foam pig also can allow the operators to do a better job of ensuring the safety of expensive pigging equipment in previously unpiggable lines.

If the soft pliable pig becomes stuck the operator can simply increase the pressure to push the pig through the impediment, creating an uneventful issue. The use of such a pigging element help keep the populous safe living in close proximity to pipelines which were previously unpiggable but carrying explosive or combustible mediums.

A pipeline gauging tool of this disclosure may be used in advance of more sophisticated inspection tools to reliably detect, identify, and establish the position and severity of changes in the geometry of a pipeline as well as sediment contained within the cross section of the pipeline that will become a restriction to fluid flow. These changes in geometry may include, but are not limited to, bends, changes in thickness, dents, impact points, accumulated sediment, valve seats, and welds. The tool may include a foam body containing magnetic, acoustic, laser, or fiber optic (e.g. LED with photovoltaic cell) sensing capabilities (or some combination thereof). As the tool encounters changes in pipeline geometry, the foam body deforms or deflects and then resets after its passes that geometry. The tool may be used in pipelines like that used to transport hydrocarbon products or water under pressure, and may be used in pipelines carrying explosive or combustible mediums. This tool can be especially useful in long subsea pipeline systems which very sensitive to applying pipeline tools that could become lodged or stuck, rendering the pipeline matrix unusable.

Additionally, because the tool includes a very soft and pliable body, the tool is far less susceptible to becoming lodged or stuck in the pipeline hang up or wedge in the line when encountering changes in pipeline geometry. If the tool somehow does become hung up or wedged, line pressure can be used to compress the pig's foam substrate until the overall geometry is reduced to the point where the pig can slip by the obstruction. By changing its shape by way of distortion or deflection, the pig can pass by most (if not all) obstructions.

Embodiments of a pipeline gauging tool of this disclosure may include a cylindrical body including a deformable portion located between a forward and a rearward end of the cylindrical body, a signal source, and a sensor (or an array of sensors as well as a means to store that data indicating the changes noted by the compression or deflection of the foam); the deformable portion compressible between a first size and a second smaller size; the signal source configured to have a first strength when the deformable portion is in the first size and a second different strength when the deformable portion is in the second smaller size; the sensor configured to detect the first strength and the second different strength; and means for storing the detected first and second different strengths, the sensor located nearer an outermost surface of the cylindrical body than the signal source, the signal source located nearer a longitudinal centerline of the cylindrical body than the sensor. A center cannister or housing may be used to house a power module as well as a data acquisition module, allowing the tool to function under a stored power source.

The sensor may be exposed to or in contact with the cylindrical body material. The signal source may be isolated from contact with the cylindrical body material. The signal source may be contained in a housing. The housing may further include circuity associated with signal storage or processing, as well as a power module configured to power data acquisition capabilities of the tool. One or more sensors may be circumferentially arrayed about the signal source. In embodiments, the sensors may be combined with an emitter, thereby allowing individual sensing units to be aligned with an emitting or sending unit. The sensor may be mounted on an arm that moves between a first radial distance and a second different radial distance relative to the longitudinal centerline of the body. The signal source may be a magnetic source. In other embodiments, the signal source may be an acoustic source or a light source used in conjunction with photovoltaic cells that can identify changes in the pipeline wall by means of restricted light flow within a fiber optic cable. In embodiments in which the signal source is a fiber optic cable, the signal source should be located nearer the external surface of the body so that deflection or deformation of the body is not masked by the amount of foam but rather corresponds to movement of the cable.

BRIEF DESCRIPTION OF THE DRAWINGS

FIG. 1 is an embodiment of a pipeline gauging tool of this disclosure including magnetic capabilities. The tool includes an elastic foam pig with magnets and sensors installed. The magnets may be encased in urethane to minimize the magnetic attraction to the metal pipeline wall thereby reducing the potential for rogue magnets left behind on the pipeline wall without reducing the overall measured magnetic flux. The sensors are configured to measure the magnetic field strength as the foam pig is squeezed by reductions in the diameter of the pipeline walls, such as but not limited to a dent or sediment, bringing the magnets closer to the sensors.

FIG. 2 is an embodiment of a pipeline gauging tool of this disclosure including acoustic capabilities. The tool includes an elastic foam pig with acoustic transceivers, associated sensors, and a plate having a higher density than that of the foam pig. In applications where a light-based technology can be used, the tool may include one or more lasers and associated sensors, or an LED circuit coupled with a fiber optic cable or strip and a photovoltaic cell.

FIG. 3 is an embodiment of a pipeline gauging tool of this disclosure including magnetic capabilities. The tool includes an elastic foam pig with magnets and sensors installed. The sensor is located nearer the outermost surface of the cylindrical body than the signal source, the signal source is located the longitudinal centerline of the cylindrical body than the sensor.

FIG. 4 is an embodiment an embodiment of a pipeline gauging tool of this disclosure including acoustic capabilities. The tool includes an elastic foam pig with an acoustic sensor connected to power and electronic modules contained by a housing. The sensor is located nearer the outermost surface of the cylindrical body than the signal source, the signal source is located nearer the longitudinal centerline of the cylindrical body than the sensor. Lasers can also be used in the same assembly to further enhance the ability where a light-based technology could be used.

FIG. 5 is an embodiment of a pipeline gauging tool of this disclosure including a fiber optic circuit. A fiber optic cable or circuit can be encased in urethane for protection, and then be integrated or attached to the surface of the pig. A light source may be attached to one end of the circuit combined with a photovoltaic cell on the other end to measure the voltage derived from the light. As the fiber optic cable flexes under a dent or other defect or impediment such as an elliptical pipe, sediment, or heavy scale, the light transmitted through the fiber optic cable is reduced as a function of the movement. The photovoltaic cell located in the circuit then measures the reduced light transmitted by the cable in the form of voltage. The voltage is then equated to the amount of movement imparted to the cable.

FIGS. 3 & 4). The sensing capability may be used in conjunction with a gyroscope to show the position of the pig at the time of the measurement. A counter may be used to establish the number of girth welds or weld counts to better help locate the axial location of the pig within the line. Typically, there is a magnetic flux difference at each girth weld. This variation in magnetic flux can then be measured by a magnetometer. Each change in magnetic flux can be associated with a girth weld. Counting these variations can then be associated back to a weld in the pipeline that is traceable by drawing information that can aid in the location of the weld. All the data can be maintained on board the pig for analysis after the pig has made its run. In some embodiments, the pig can download data while still in the line to better ensure the location of the measurements are correlated to outside download points.

DETAILED DESCRIPTION

Referring to the drawings, a re-settable pipeline gauging tool or pig 10 of this disclosure includes a flexible, spongy or foam pig body 11 with a sensor bundle 20 contained in a housing 50 located at or along a longitudinal centerline 19 of the pig body. The tool 10 is "re-settable" in that it has a first shape before encountering a change in pipeline geometry or thickness, a second different shape when encountering the change (deformed relative to the first shape at least in part due to a dent, bend or some other physical attribute of the pipe), and then returning to the first shape after passing the change in pipeline geometry. In this way, the tool 10 is "self-resettable," requiring no means other than the natural elasticity of the foam pig body 11. In embodiments, the foam pig body 11 does not require sealing discs or cups located about its periphery.

A pipeline gauging tool 10 of this disclosure can work in several ways: as a function of a magnetic field and the distance from a magnetic flux sensor; as an acoustic tool in which an acoustic wave is bounced off equally spaced metal targets; by reflection of light by means of a laser. The tool 10 can also make use of the fiber optic assembly in which the light transmitted varies in the circuit as a function of any bending or flexing of the fiber optic cable. In each case the measurement may be made with a sensor and a medium of a kind known in the art to cause a change in the measured signal that is reflected.

The sensor bundle 20 may be outfitted with magnet flux meters, acoustic sensors, or lasers aimed at an appropriate signal-reflective plate or mirror. As the foam pig body 11 is deflected or deformed by the change in pipeline geometry, the magnet, reflective media, of fiber optics deflect, causing a variation in signal being measured. This variation is proportional to the amount of deflection between the first and second different shape and, therefore, indicative of the change In conjunction with the sensing capabilities of any changes felt to the foam body 11, other sensors can be used in conjunction with the primary measurements that are directed toward sensing deflection. The secondary measurements may include a gyroscope 83 to indicate the position of the pig 10 as the measurements are taken. A counter 87 may be employed to count girth welds for a secondary method of locating the position of the pig 10 within the pipeline. The tool or pig 10 may also utilize accelerometers 85 to sense the acceleration and velocity of the pig 10 to again offer a way to calculate the position of the pig 10 as well as the velocity of the pig 10 when it encountered the anomaly in the pipeline. In some embodiments, pressure transmitters 89 may also be employed to measure the differential pressure associated with the pig 10 as well as the temperature of the fluid surrounding the pig 10 at any given time. Other transmitters such as but not limited to temperature sensors 91 can also be utilized as needed.

The flexible, soft pig body 11 is potentially impossible to become trapped in the pipeline unless there is an obstruction of appreciable size. Upon becoming stuck, the pressure can be simply be increased until the tool 10 frees itself by means of the pig body 11 changing shape (distortion or deflection) to move past the obstruction. Once past the obstruction, the pig body 11 then returns to its original shape.

Embodiments of a re-settable pipeline gauging tool 10 of this disclosure tool may be used in advance of a more sophisticated or expensive tool to ensure no new or unknown dents or imperfections can be found in the line which can create issues when running the larger more expensive pigging tools. The tool 10 is configured to move forward through the line under differential pressure provided by pipeline product flow and deform or deflect when it encounters a change in pipeline geometry. This deformation or deflection may be in a lateral direction, a longitudinal direction, or in both directions. The deformation or deflection may also be in a radial direction. For example, the pig can rotate in the pipeline depending on the geometry of the pipeline as well. Elbows typically create a radial movement in the tool 10.

Once the tool 10 is run and the data stream from the tool 10 is analyzed, an engineer or operator can be assured that the more expensive tools can run without issue. Because the tool 10 is resettable—meaning the tool 10 may return to its nominal shape after each deformation or deflection without any external or additional influence, or to a different deformed or deflected state, the tool 10 allows operators to see changes in geometry with enough certainty to make informed decisions relative to the insertion and operation of more sophisticated (and expensive) tools.

In embodiments, the tool 10 includes cylindrical foam pig body 11 including at least one deformable portion 13 located between its forward and rearward ends 15, 17 as it encounters an obstruction. The deformable portion 13 is compressible between a first size and a second smaller size. In some cases, the body 11 may have a first deformable portion 13 and a second deformable portion 13, each portion 13 corresponding to respective first and second anomaly encountered along the length of the pig body 11. The body 11 may have multiple portions 13 each deformed different than the others as the body 11 encounters obstructions.

The body 11 includes a signal source configured to have a first strength when the deformable portion 13 is in the first size and a second different strength when the deformable portion 13 is in the second smaller size. The body 11 also includes one or more sensors associated with the signal source and configured or arranged to detect the first strength and the second different strength. The body 11 may also include means for storing the detected first and second different strengths. The body 11 may also include the previously discussed secondary transmitters and sensors that include, for example, a gyro, accelerometers, temperature, pressure, and radar.

In embodiments, the body 11 may be a soft, flexible foam body with a sensor bundle 20 arranged about a longitudinal centerline 19 of the body 11. Depending on the method employed, the sensor bundle 20 may include one or more magnet flux sensors, or one or more acoustic sensors or laser devices aimed at a reflective media. The reflective media may be a plate or mirror that reflects the acoustic or laser signal back to the sensor. The plate may have a higher density than that of the foam. The pig body 11 may also include an instrumentation package 30 in communication with the sensor bundle 20. The instrumentation package 30 may include one or more microprocessors with associated software as well as computer readable/writeable storage media. The instrumentation package 30 may also include means for transmitting data 67 collected by the sensor bundle 20 to outside of the pipeline. The power to operate the tool 10 while in the pipeline may also be contained in the instrumentation package 30, or as a trailing entity if more power is needed. In some embodiments, the instrumentation package 30 includes a power source 65.

Figure 1:
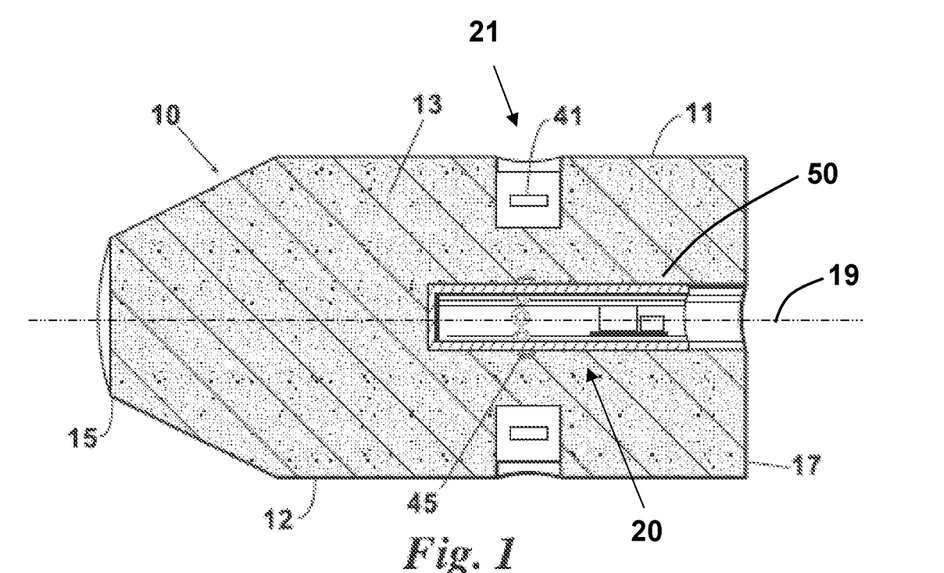

Referring to FIG. 1, in some embodiments of a re-settable pipeline gauging tool 10 of this disclosure includes a soft flexible body 11 containing a signal source 21 including one or more magnets 41 placed in predetermined locations about the soft, flexible foam body 11, with one or more sensors 25 including magnetic flux sensors 45 housed by the body 11 and coaxially aligned with the signal source 21. The magnets 41 may be encased or coated with a coating so that the magnetic strength is reduced to render the magnets 41 substantially benign with respect to the metal pipeline yet readily measurable by the sensors 45. In embodiments, a urethane coating or its equivalent may be used as the coating. Analysis means known in the art may be used to determine the magnetic field strength as a function of the distance between the magnetic flux sensor 45 and the magnet 41. Signal strength increases (decreases) between the magnet 41 and the sensor 45 as the magnet 41 is pushed closer to (moves away from) the sensor 45.

In testing, a magnet 41 was added to a foam pig body 11 and a magnetometer 81 was used to measure the magnetic field measurement as the foam pig body 11 was compressed. As the body 11 was compressed over an inch of travel the magnetic signal was measured to increase by almost double. The signal was then tested numerous times with excellent repeatability of the magnetic signal measured.

However, in practical applications of this embodiment difficulties may be encountered with measurement precision and accuracy. The magnets can be attracted to the pipeline wall even when placed an inch or so below the surface of the pig, thereby compressing the foam located between the magnet and the pipe wall. When an anomaly is encountered this compressed section may be less sensitive to the anomaly and the foam must also be compressed below the magnet.

Figure 2:
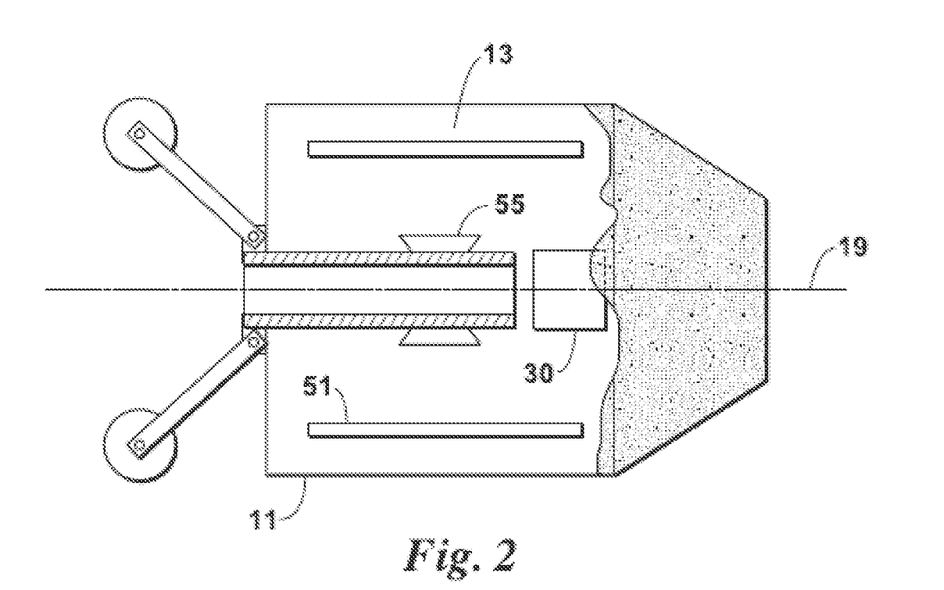

Referring to FIG. 2, in other embodiments of a re-settable pipeline gauging tool 10 of this disclosure an acoustic- or laser-based sensing approach may be applied in a similar fashion with similar results. One or more reflective media 51 such as metal targets or mirrors may be arranged coaxial with the one or more acoustic receivers or transducers 55. Analysis means known in the art may be used to determine the magnetic field strength as a function of the time required for the signal to travel between the acoustic sensor 55 and the reflective media 51. Signal strength increases (decreases) as the reflective media 51 is pushed closer to (moves away from) the acoustic sensor 55.

Figure 3:
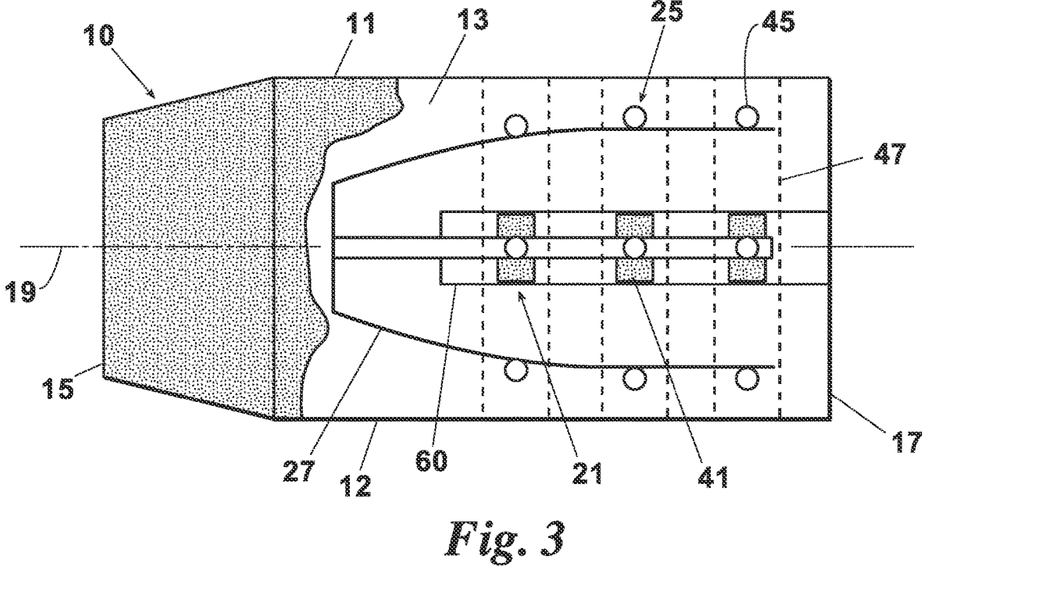
Figure 4:
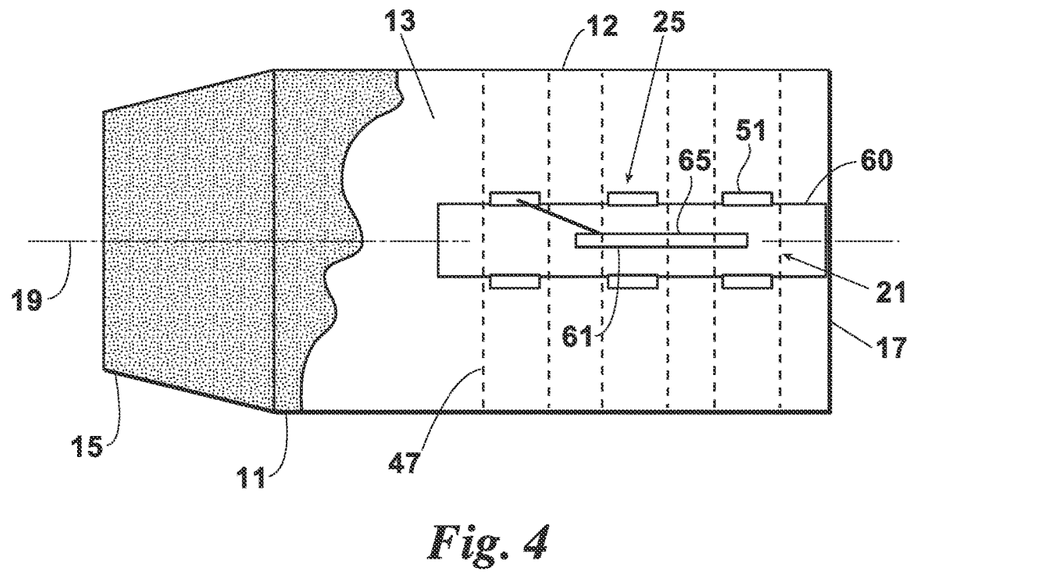

Referring now to FIGS. 3 & 4, in some embodiments one or more magnetic flux sensors 45 may be placed in predetermined locations about the soft, flexible foam body 11, with one or more magnets 41 housed within a sealed unit 60 such as an electronics carrier or housing. Unlike the embodiment of FIG. 1, the magnets 41 are not pulled toward the pipe wall and the sensors 45 become "free floating" as the pig body 11 travels through the pipeline and encounters anomalies in the pipe wall. The carrier or housing may contain data storage means 61 and data processing means 63. The sensors 45 may be placed at or toward the external or outermost circumferential surface 12 of the pig body 11, entirely outside of the sealed unit 60. An appropriate coating such as but not limited to urethane may be applied to the sensors 45 and effective for protecting the sensors 45 without negatively affecting their sensitivity. The sensors 45 may be axially aligned with the signal source. In some embodiments, the sensors 45 may be hall effect sensors, the signal source being the magnet 41. In most applications, it is expected that the sensors 45 will be located near the outside 12 of the foam body 11 facing in, or near the centerline 19 of the foam body 11 facing out, depending on how the body 11 is configured. By way of a non-limiting example, the complexity of the wiring may also have an impact on the configuration.

In other embodiments, the sensors may include acoustic sensors 51, such as but not limited to acoustic transceivers and radar integrated chips. The acoustic sensor 51 may be connected to power and electronic modules by an umbilical carrier. The electronics carrier or housing 60 may include a plate or mirror 55.

In embodiments, and using a magnetic arrangement as a non-limiting example, one or more sensors 45 may be located along a support such as deflectable arm or moveable bar 27 contained by the body 11. The bar 27 may have a higher density than that of the foam 11. The bar 11 places the sensor a first radial distance from the circumferential external surface 12 of the body 11 when the body 11 is a non-deformed state and at a second different radial distance when the body 11 is in a deformed state. When at the first radial distance the sensor 45 is closer to the external surface 12 and farther from the longitudinal centerline 19 of the body 11; when at the second different radial distance the sensor 45 is farther from the external surface 12 and nearer the longitudinal centerline 19 of the body 11. A plurality of deflectable arms or bars 27 may be used, each bar of the plurality circumferentially spaced apart from the others, with each bar 27 including a linear array of sensors 45. Signal strength increases (decreases) between the sensors 45 and the magnet 41 as one or more sensors 45 are pushed closer to (moves away from) the magnet 41. Analysis means known in the art may be used to determine the magnetic field strength as a function of the distance between the sensor 45 and the magnet 41.

The signal source 21 may be one or more magnets 41 placed near or toward the longitudinal centerline 19 of the body 11. Each magnet 41 may be located in a circumferential band 47 corresponding to the array of sensors 45 surrounding the magnet 41. The magnets 41 may be located on or arranged about the electronics carrier or housing 60 containing the data storage or processing means 61, 63. In other embodiments, the magnets 41 may be contained by the carrier 60. Unlike the embodiment of FIG. 1, the magnets 41 are less likely to be displaced from their initial placement or, worse yet, pulled out of the body 11 by attraction to the pipeline wall. Attaching the magnets 41 to the electronics carrier 60 insures that the magnets 41 cannot break free short of a catastrophic issue that would tear the entire pig apart. Appropriate shielding of a kind known in the art may be used to isolate the magnets from the electronics.

Further, circumferentially arraying the sensors 45 about each magnet 41 provides multiple data points for each band 47 rather than a single point of data (like in FIG. 1), thereby providing sensing over a broader time differential, increasing accuracy, ensuring more features or characteristics of an anomaly can be detected, and do so with an averaging bias. In other words, and by way of a non-limiting example, three sensors 45 may make similar measurements and based on the inclination of the arm or bar 27 positioning, the sensor 45 readings or signals may be averaged to allow more than a single measured point to be obtained. Depending on the speed of the pig 10 and the number and placement of the magnets 41 a significant increase in the number of data points acquired may be obtained. For example, when compared to the embodiment of FIG. 1 a moving bar 27 approach with one circumferential band 37 with four sensors 45 arranged about a respective magnet 41 allows at least four times the amount of data to be taken when an anomaly six inches in length is encountered as opposed to getting only one data point with a single magnet approach or with three magnets arranged about a sensor. The number of bands 47 is determined by the confines of the foam substrate 11 and the spacing required so that the sensors 45 are not so close as to pick up simultaneous readings.

Additionally, placing the magnets 41 internally as opposed to the outside edge or surface 12 of the foam body 11 also helps ensure there is no buildup of oxidized metals on the foam body 11 that are then held in place by the strength of the magnet 41. A magnet 41 near the external circumferential surface 12 ensures a buildup of metal oxides that may push the magnet 41 closer to the sensor 45 over time as the buildup increases with time, corrupting the logged readings. Basically, a magnet 41 placed outward of the sensor 45 and toward the external circumferential surface or edge 12 of the foam body 11 can cause the data to become corrupted almost as soon as the pig 10 is launched. As runtime increases under this scenario, so does the error.

Figure 5:
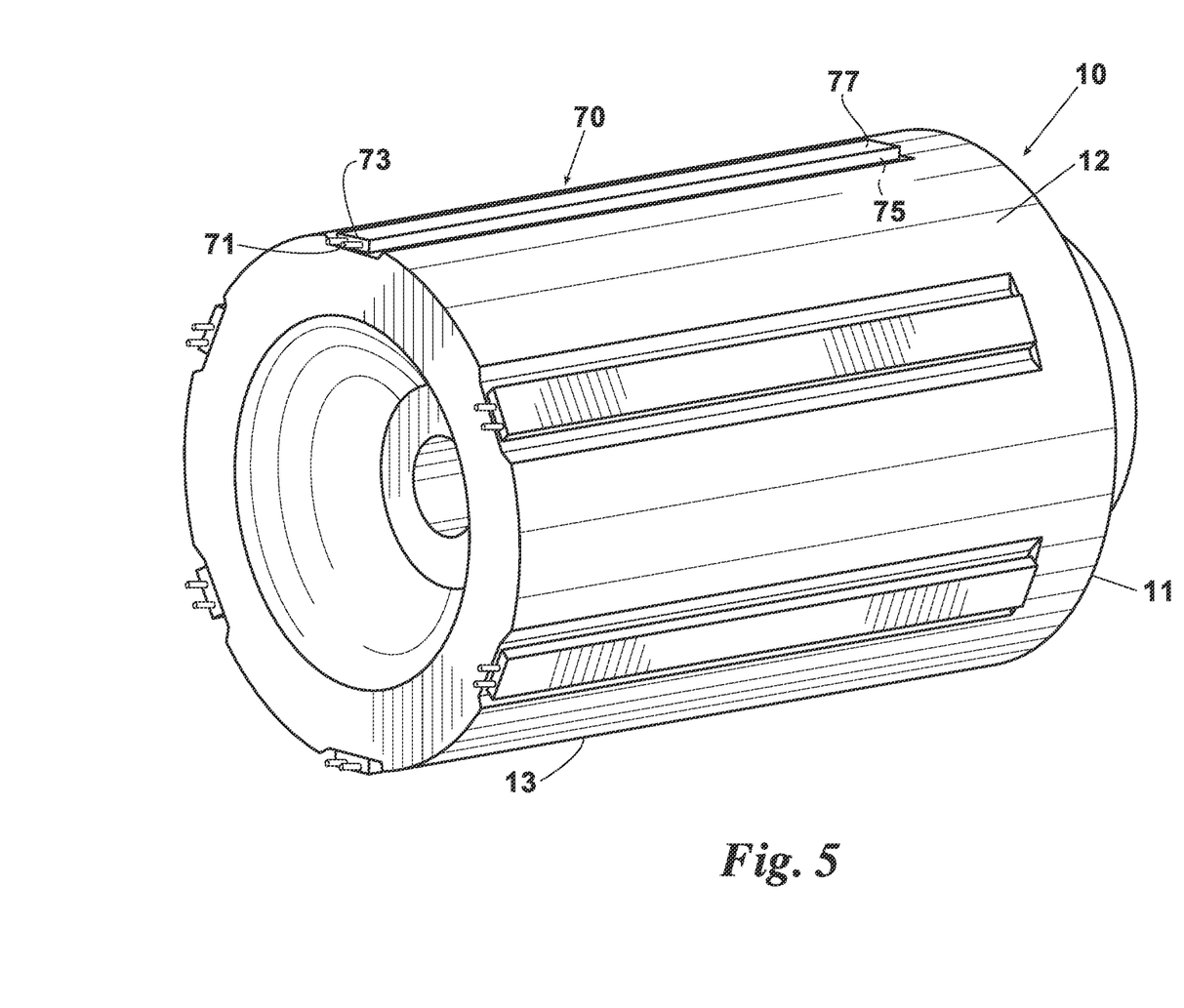

Referring to FIG. 5, embodiments of a re-settable pipeline gauging tool 10 of this disclosure may use fiber optics as a sensor bundle 20 to identify the amount of variation observed in pipeline geometry or thickness. The pig body 11 includes a fiber optic line or loop circuit 70 with a constant light source 71 at one end 73 of the circuit 70 and a photo voltaic cell 75 at the other end 77 of the circuit 70. The circuit 70 may include a fiber optic cable. As the fiber optic circuit 70 is moved or bent in any direction the light emitted to the other end 77 of the circuit 70 is reduced to a lower measured voltage. The voltage read is then proportional to the amount of movement applied to the circuit 70 as it bends around any imperfection in the pipeline wall or over any impediment or buildup. The voltage output may be analyzed later to determine how large the bend, imperfection or sediment bed is that was measured in the confines of the pipeline wall. For the fiber optic sensing approach, the fiber optics should be located near the outer surface 12 of the pig body 11. If positioned too far inward, the sensor 75 would not pick up all of the movement absorbed by the foam body 11 and, as a result, have a sufficient error associated with the measurement.

In embodiments, the constant light source 71 by may be a LED light source to help minimize power consumption. Other light sources however can be used if needed. The LED approach uses a minimal amount of power which reduces the need for added weight created by added batteries.

Figure 6:
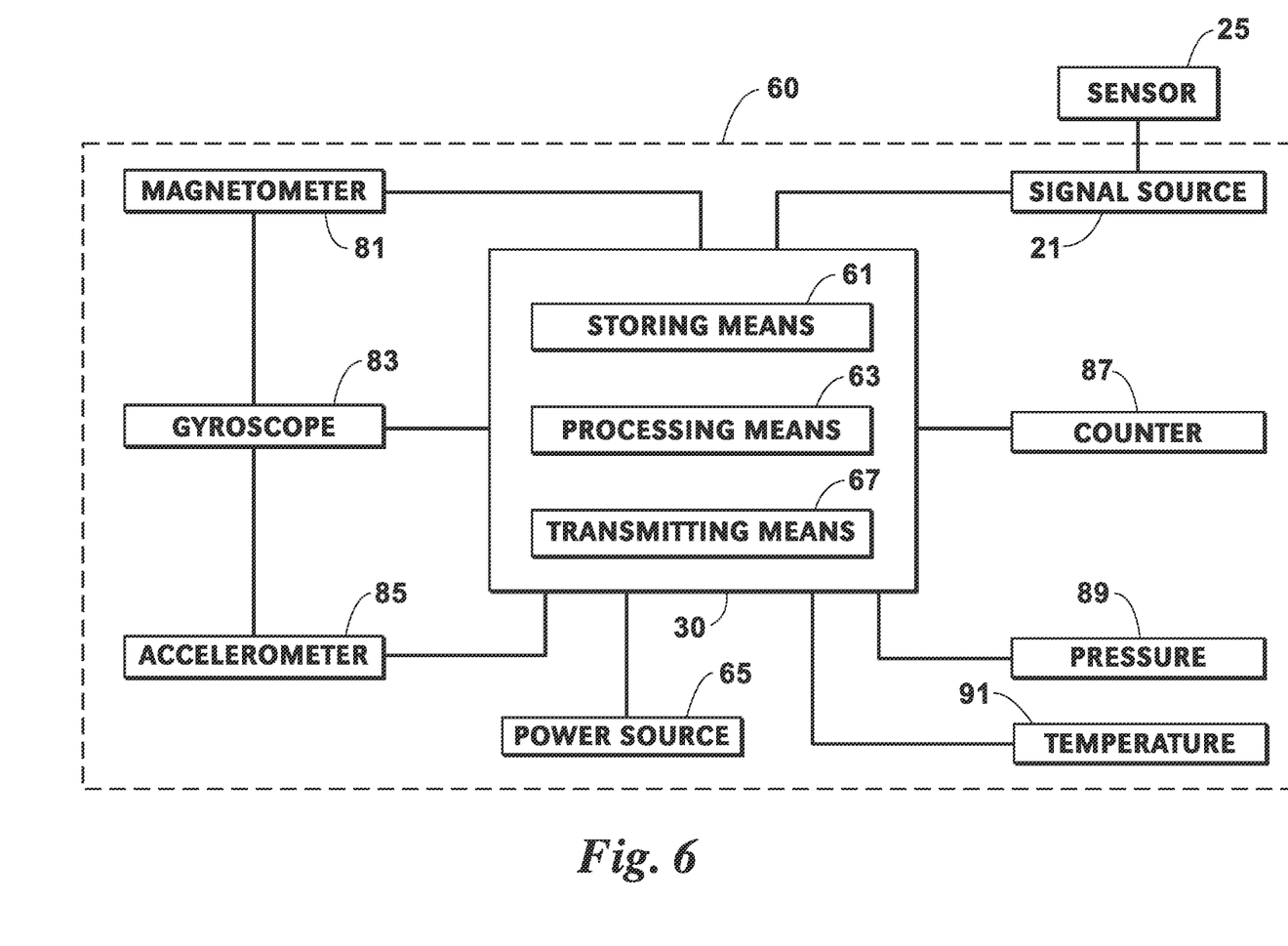
FIG. 6 is a schematic of an embodiment of an data acquisition system of this disclosure. The data may be collected by an onboard data acquisition system located internal to the pig (see e.g.

Embodiments of a re-settable pipeline gauging tool 10 of this disclosure may further include a magnetometer 81 coupled with a gyroscope 83 and an accelerometer 85 to allow the orientation of the tool to be determined at any time. The accelerometer 85 may be used to determine placement, as is the magnetometer 81. Each pipe length contained in a pipeline circuit has a different magnetic flux formed as the metal itself is formed into the pipe section. The magnetometer 81 can then sense each flux change as the pig passes through the pipeline. Each flux change would then be indicative of a new pipe section and or the associated girth weld associated with the union. Because pipeline companies know how many pipe sections are contained in their pipelines, the girth weld count can be used to identify the general location of the tool in the pipeline. This measured value can then be compared to the accelerometer readings to gain a close proximate location of any anomalies in the pipeline that were measured.

The culmination of the fiber optic circuits 70 with the other magnetic and accelerometer data can then be used to identify this anomaly (anything from sediment to dents) contained in a given pipeline. The location can then also be determined by the magnetometer and accelerometer data to determine very precise locations, locating by means of both direct measurements and refining the location by analytical and calculated manipulation of the data.

In embodiments, the body 11 may be a urethane-based foam body or its equivalent. The body 11 may have a diameter substantially the same as the pipeline or pipeline run into which it is be deployed. In embodiments, the diameter may be in a range of 2 inches (50 mm) to 24 inches (600 mm), there being subranges as well as individual discrete values within this broader range. The length of the body 11 may be in a range of 3 inches (76 mm) to 36 inches (914 mm), there being subranges as well as individual discrete values within this broader range. In some embodiments, the length may exceed 36 inches. The overall diameter may even extend to 40 inches (1016 mm) or more. The foam material may be selected such that it tolerates the pipeline product (and does not react with the product) and may be compressed in a range of 5% to 50% of its nominal diameter without permanent deformation, there being subranges as well as individual discrete values within this broader range.

As the tool 10 travels through the line, the tool 10 may encounter a change in geometry that deforms or deflects the soft, flexible foam body 11 of the tool 10. For example, the body 11 may be deformed or deflected by an impact with a dent, bend, weld or some other physical attribute of the pipe. As the body 11 deforms or deflects, the magnet 41 or reflective media 51 moves closer to the sensor 45, 55, thereby establishing a different signal or time interval to the sensor 45, 55 from that of the pig body 11 in its nominal shape or its previously deformed or deflected shape. More deformation or deflection of the body 11 means a stronger signal or shorter time interval than less deformation or deflection. (The exception being embodiments that make use of a fiber optic cable, in which case any deformation of the fiber optic cable will reduce the voltage measured as a function of the light transmitted to the photovoltaic cell.) In all cases, the body 11 of the pig 10 allows the signal to be sensed in a way that is proportional to the distance between the magnet 41 or reflective media 51 and the corresponding sensor or sensors 45, 55. Deformation or deflection may be continually measured as the tool 10 travels through the line and changes shape. Unless there is a blockage of appreciable size in the line, that is, a blockage that presents an opening in the line below that of a maximum compression of the soft, flexible pig body 11, the tool 10 does not become trapped in the line. When it does become hung up or wedged by a change in pipeline geometry, the line pressure may be increased until the soft body 11 of the pig 10 pushes by the obstruction.

The invention claimed is:

1. A pipeline inspection tool (10) comprising:
a cylindrical body (11) including a longitudinal centerline (19) and an external circumferential surface (12), the cylindrical body having a deformable portion (13) located between a forward end (15) and a rearward end (17) of the cylindrical body,
the deformable portion containing a plurality of signal sources (21) and, for each signal source of the plurality, a corresponding sensor (25), the corresponding sensor being located nearer the external circumferential surface of the cylindrical body than its corresponding signal source of the plurality of signal sources, the corresponding signal source being located nearer the longitudinal centerline of the cylindrical body than the corresponding sensor and aligned with the corresponding sensor;

the deformable portion moveable between a first size and a second size, the first size being when the deformable portion is in an uncompressed state, the second size being when the deformable portion is in a compressed state and smaller than the first size;

each signal source configured to have a first strength when the deformable portion is in the first size and a second strength different than the first strength when the deformable portion is in the second size;

the corresponding sensor configured to detect the first strength and the second strength;

a housing (60) contained by the cylindrical body (11), the housing surrounding means for storing (61) the detected first and different strengths and a power source (65); and a support arm (27), the corresponding sensor being located on the support arm, the support arm being moveable between a first and a second radius about the longitudinal centerline as the deformable portion moves between the first and second sizes, the second radius being smaller than the first radius.

2. The pipeline pig of claim 1, further comprising, the plurality of signal sources being arranged in at least one circumferential band (47) about the deformable portion.

3. The pipeline pig of claim 1, the corresponding sensor being a magnetic flux sensor (45), the corresponding signal source being a magnet (41).

4. The pipeline pig of claim 1, further comprising, the housing containing a magnetometer (81) coupled with a gyroscope (83) and an accelerometer (85).

5. The pipeline pig of claim 1, wherein, the cylindrical body is a cylindrical foam body.

6. A method of detecting changes in pipeline geometry the method comprising:

launching a pipeline inspection tool (10) into one end of a pipeline;

allowing the pipeline inspection tool to traverse the pipeline along with a product flow through the pipeline;

collecting deformation and deflection data of the pipeline inspection tool as the pipeline inspection tool traverses the pipeline and encounters changes in the pipeline geometry; and retrieving the pipeline inspection tool at another end of the pipeline;

wherein, the pipeline inspection tool comprises:

a cylindrical body (11) including a deformable portion (13) containing a plurality of signal sources (21) and, for each signal source of the plurality, a corresponding sensor (25), the corresponding sensor being located nearer an external circumferential surface (12) of the cylindrical body than its corresponding signal source of the plurality of signal sources, the corresponding signal source being located nearer a longitudinal centerline (19) of the cylindrical body than the corresponding sensor and aligned with the corresponding sensor, and a support arm (27), the corresponding sensor located on the support arm;

the deformable portion moveable between a first size and a second size, the first size being when the deformable portion is in an uncompressed state, the second size being when the deformable portion is in a compressed state and smaller than the first size;

the support arm moveable between a first and a second radius about the longitudinal centerline as the deformable portion moves between the first and second sizes, the second radius being smaller than the first radius;

each signal source configured to have a first strength when the deformable portion is in the first size and a second strength different than the first strength when the deformable portion is in the second size;

the corresponding sensor configured to detect the first strength and the second strength.

7. The method of claim 6, further including, analyzing, using a microprocessor with embedded software, the collected deformation and deflection data, the analyzing including quantifying the changes in pipeline geometry and correlating the changes with locations along the pipeline.

8. The method of claim 6, further including, the pipeline inspection tool transmitting the collected deformation and deflection data external to the pipeline.

9. The method of claim 6, wherein, the plurality of signal sources is arranged in at least one circumferential band (47) about the deformable portion.

10. The method of claim 6, wherein, the corresponding sensor is a magnetic flux sensor (45), the corresponding signal source being a magnet (41).

11. The method of claim 6, wherein, the pipeline inspection tool includes a housing (60) contained by the cylindrical body (11), the housing surrounding means for storing (61) the detected first and different strengths and a power source (65).

12. The method of claim 11, wherein, the housing contains a magnetometer (81) coupled with a gyroscope (83) and an accelerometer (85).

13. The method of claim 6, wherein, the cylindrical body is a cylindrical foam body.

* * * * *